United States Patent [19]

Kirk et al.

[11] Patent Number: 4,702,893
[45] Date of Patent: Oct. 27, 1987

[54] ACID AIR POLLUTION PRECIPITATORS

[76] Inventors: Samuel A. Kirk, Box 65, Pringle, S. Dak. 57773; Clair F. Kirk, 856 Pine St., Wheatland, Wyo. 82201; John W. Kirk, Box 65, Pringle, S. Dak. 57773; Douglas J. Kirk, 3190 Cabrillo Dr., Tracy, Calif. 95376

[21] Appl. No.: 749,389

[22] Filed: Jun. 27, 1985

[51] Int. Cl.$^4$ ............................................. C01B 17/04
[52] U.S. Cl. .................................... 422/173; 422/111; 422/171; 422/172; 422/176; 422/183; 422/189; 422/203; 422/229; 423/571; 55/269; 55/337; 55/DIG. 25
[58] Field of Search ..................... 422/111, 169–173, 422/176, 183, 189, 201–203, 229; 55/266, 269, 337, DIG. 25; 423/571

[56] References Cited

U.S. PATENT DOCUMENTS

| | | | |
|---|---|---|---|
| 2,386,390 | 10/1945 | Fernelius et al. | 422/202 |
| 3,730,691 | 5/1973 | Lang et al. | 422/172 |
| 3,768,260 | 10/1973 | Glenn | 422/173 |
| 3,853,484 | 12/1974 | Sudar et al. | 422/171 |
| 4,244,921 | 1/1981 | Tasior et al. | 422/201 |
| 4,249,921 | 2/1981 | Lell et al. | 55/DIG. 25 |

FOREIGN PATENT DOCUMENTS 2731755  1/1979  Fed. Rep. of Germany ........ 55/337

Primary Examiner—David L. Lacey
Attorney, Agent, or Firm—Merchant, Gould, Smith, Edell, Welter & Schmidt

[57] ABSTRACT

An apparatus is provided for the elimination of the gaseous pollutants sulfur dioxide and nitric oxide from the emissions of furnaces and smelters, and for the production of two commercial products, liquid sulfur and nitric acid. Two precipitators are operated in series, each containing an annular reaction chamber and a cylindrical separation chamber surrounded by the reaction chamber. The first precipitator combines the furnace or smelter emissions with methane in its reaction chamber in order to reduce the sulfur dioxide in the emissions to sulfur. The emissions are then passed through a tangential duct to the first precipitator's separation chamber where the fine sulfur praticles are converted to liquid sulfur by sending the mixed gases through an involuted spiral baffle and allowing the sulfur particles to coalesce on a trip wire grid. The sulfur particles then melt and fall by gravity to the bottom of the separation chamber, from which point the liquid sulfur is withdrawn. The gaseous emissions then pass from the first precipitator to the reaction chamber of the second precipitator, where they are combined with air and water to change to nitrogen dioxide and then to nitric acid. After passing into the second precipitator's separation chamber, the nitric acid is pumped to the top of the second precipitator's separation chamber and then is concentrated to commercial nitric acid by allowing the acid to descend through a steam jacket in the second precipitator's separation chamber. From the bottom of the second precipitator's separation chamber, the nitric acid is withdrawn as a commercial product from the second precipitator.

2 Claims, 3 Drawing Figures

ACID AIR POLLUTION PRECIPITATORS

FIELD OF THE INVENTION

This invention pertains to a precipitator apparatus for the removal of gaseous pollutants from emission streams produced by furnaces and smelters, and more particularly to a dual precipitator apparatus wherein sulfur dioxide and nitric oxides are removed from the gas emission streams, and sulfur and commercial nitric acid are produced.

DESCRIPTION OF THE PRIOR ART

Modern power stations produce a furnace gas which contains the gaseous pollutants sulfur dioxide and nitric oxides. These furnace emissions are normally treated with an electrostatic precipitator, which eliminates only the dust particles, not the above two gaseous pollutants. Typically, the emissions are treated for the removal of sulfur dioxide by passing the emissions through a gas scrubber in which ground limestone precipitates calcium sulfate mixed in water. However, this process is expensive, and the scrubber does not remove nitric oxides. Attempts to remove the sulfur dioxide by mixing it with methane gas and thereby reducing it to sulfur have proven unsuccessful, because of difficulty in separating the sulfur from the furnace's flue gas. The sulfur particles are extremely fine, and they are carried and emitted along with the flue gas. Therefore, the recovery of sulfur from this process has proven unsuccessful. Also, nitric acid recovery from furnace emissions has been suggested, but efforts have not be viable.

SUMMARY OF THE INVENTION

The general purpose of the present invention is to provide a precipitator which removes the pollutants sulfur dioxide and nitric oxide from the gas emissions of furnaces and smelters. By removing these pollutants from the stack emissions, acid rain can be reduced and sulfur dioxide emissions can be brought in conformance with government regulations. New coal fired power plants must limit emissions to 0.5 Kg or less of sulfur per million BTU to conform with established environment standards. Emission levels for nitric oxide are not regulated at the present time.

An important advantage of the invention is the separation and recovery of two commercial products: liquid sulfur and nitric acid, as explained in detail below. In addition, the present invention can be simpler and less expensive than the processes currently used.

In the preferred form, the flue gas emissions from the furnace or smelter pass sequentially through two precipitators, designated precipitator A and precipitator B. Each precipitator consists of a reaction chamber and a separation chamber. In precipitator A's reaction chamber, the emissions are mixed with natural gas, which is primarily methane in composition. The precise amounts of natural gas are introduced by means of a computer-controlled metering system. The methane acts to chemically reduce the sulfur dioxide in the emissions to elemental sulfur which is in the form of a mist or fine crystals. Prior attempts to develop this process have been unsuccessful because of the difficulty in separating the fine sulfur particles from the furnace emissions. The present invention solves this problem by sending the sulfur through a spiral baffle in the separation chamber which produces a centrifugal force and results in the coalescence of the sulfur particles against a steam jacket at 121° C. The heated steam jacket causes the sulfur to melt and fall by gravity to the bottom of the separation chamber. The sulfur is then withdrawn in liquid form as a commercial product.

The flue gas then passes to precipitator B for treatment of the nitric oxide in the emissions. Alternatively, precipitator A could be used without precipitator B and the nitric oxide could be allowed to escape with the emissions, since emission levels for nitric oxide are not regulated by the government at the present time.

In precipitator B's reaction chamber, the emissions are mixed with air and water, which are both injected by a computer-controlled metering system. This supplies the necessary water and oxygen to change the nitric oxide to nitric acid. The nitric acid is lifted through the separation chamber to the top of the precipitator by an air lift pump and is then concentrated to commercial nitric acid at 121° C. by a steam jacket as the acid descends a spiral baffle.

DESCRIPTION OF THE PREFERRED EMBODIMENT

Figure 1:
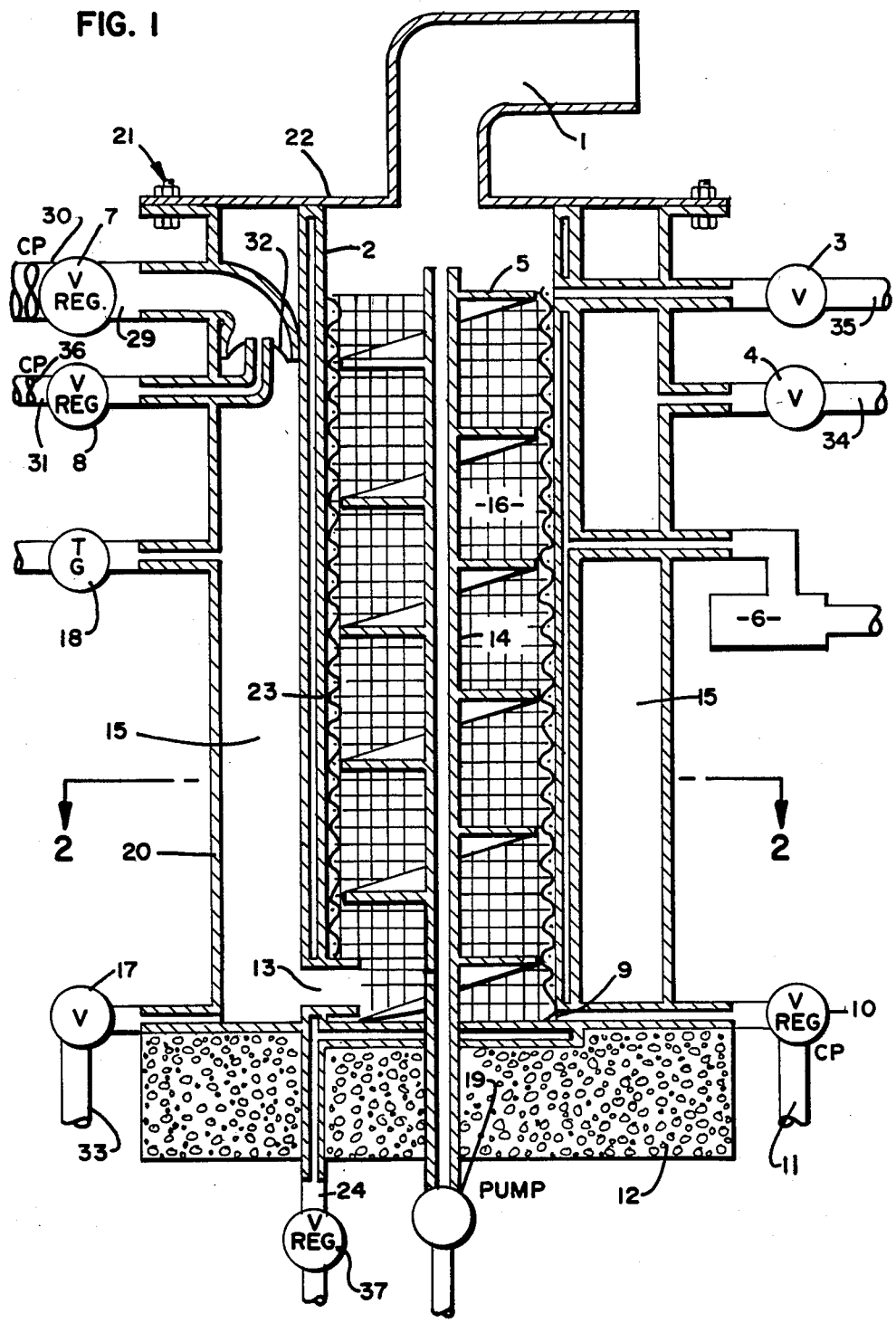
FIG. 1 is a side elevational view, in cross section, of the precipitators A and B.
Figure 2:
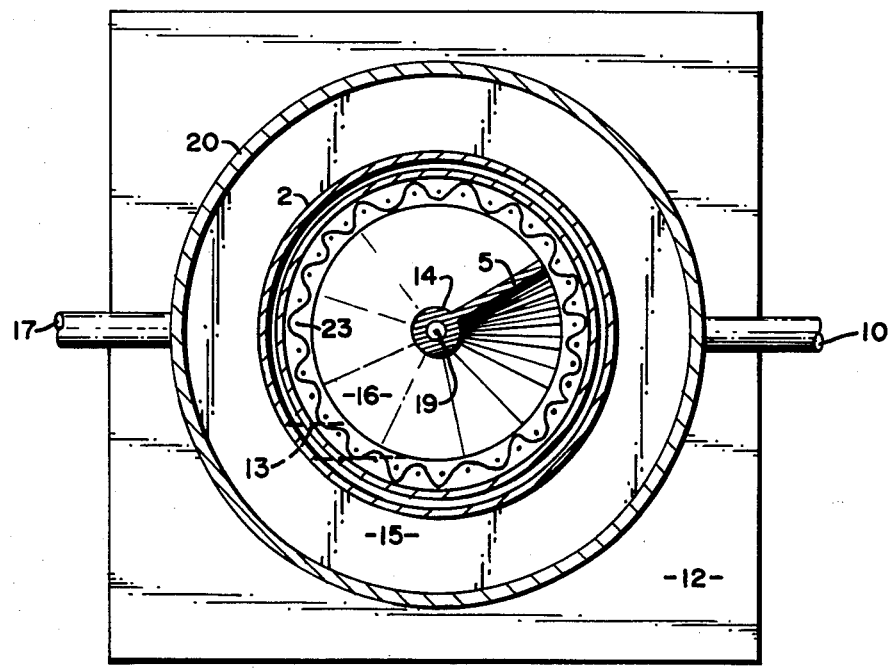
FIG. 2 is a cross-sectional plan view, taken along the lines 2—2 of FIG. 1.

As shown in FIGS. 1 and 2, precipitators A and B each are contained within a cylindrical shell 20. Each precipitator has a cover 22 which is fastened to the shell 20 with a plurality of bolts 21. Each precipitator sits on a concrete base 12 which is acid resistant. As shown in FIG. 1, emissions from a furnace or smelter pass through the emission inlet tube 29 and into precipitator A by means of an induction draft fan 30. The emission inlet tube 29 is near the top of precipitator A and has a flared end 32 which faces downward to facilitate cyclonic mixing in the reaction chamber 15. The flow of emissions through emission inlet tube 29 is controlled by a constant pressure, computer-programmed inlet valve 7 to regulate the admission of the emissions into precipitator A.

Directly below the emission inlet tube 29 is the reactant inlet tube 31. In precipitator A, natural gas is injected through the reactant inlet tube 31 to enter the flared end 32 of emission inlet tube. The flow of natural gas through reactant inlet tube 31 is controlled by a constant pressure, computer-programmed inlet valve 8 to introduce a precise amount of natural gas.

Care must be taken to ensure that air does not enter the emission stream in precipitator A, or before the emissions reach precipitator A. This is because the mixture of natural gas and air is explosive when the percentage of natural gas is between 4.5% and 15%, as is commonly known in the art.

Within the flared end 32 of emission inlet tube 29, the natural gas and flue gas are subject to counter current mixing. The natural gas, which is primarily methane, acts as a reducing agent to convert the sulfur dioxide into elemental sulfur. The reaction is at 121° C. and at the increased pressure of the induction draft fan 30:

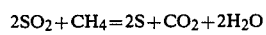

$$2SO_2 + CH_4 = 2S + CO_2 + 2H_2O$$

The elemental sulfur is in the form of a mist or fine sulfur crystals, and it is carried along with the mixed gases.

The reaction goes to completion as the mixed gases and sulfur particles pass downward through the reaction chamber 15 of precipitator A at a temperature of 121° C. If it becomes necessary to cool the gases to 121° C., a water inlet tube 34 is provided which is regulated by valve 4. However, water must not be added in excess of the amount that will evaporate at 121° C. to ensure that the nitrogen oxide in the emissions remains in the gas stream. A flow line 33 including a valve 17 is provided to remove the excess water from precipitator A which was injected through inlet tube 34 for cooling purposes. An additional inlet tube 35 including valve 3 can be used to provide water in the precipitator for cleaning when necessary.

The gases and sulfur particles then enter the separation chamber 16 of precipitator A tangentially through a duct 13 near the bottom of the reaction chamber 15 and separation chamber 16. The tangential duct 13, as shown in FIG. 2, gives the gases and sulfur particles a centrifugal effect. The duct 13 is large enough to equal the combined cross section of inlet tubes 29 and 31. The gases and sulfur pass through the duct 13 and pass upwardly through the spiral baffle 5 contained within precipitator A's separation chamber 16. From the view shown in FIG. 2, the gases and sulfur move counter-clockwise through the baffle 5 in a rolling and cyclonic motion.

The reaction chamber 15 and the separation chamber 16 are divided by a cylindrical steam jacket 2. The reaction chamber 15 surrounds the separation chamber 16. The steam jacket 2 is a double-walled vessel that is capable of withstanding moderate pressure (25 to 50 pounds per square inch). It is made of stainless steel or fiberglass reinforced polyvinyl dichloride. A steam accumulator 6 supplies enough steam to maintain the steam jacket and precipitator at 121° C. A steam jacket outlet 24 including valve 37 is provided for the condensed steam.

The inner wall of the steam jacket 2 contains a cylindrical trip wire grid 23, which is replaceable and shaped to be substantially corrugated. The trip wire grid can be made of stainless steel or some form of plastic. The trip wire grid is positioned between the steam jacket 2 and the outer edge of the involuted spiral baffle 5. The baffle 5 has its inner edge welded to a hollow cylindrical alignment tube 14 which is positioned in the center of precipitator A's separation chamber 16. As the gases and sulfur particles pass through the baffle 5, the grid 23 produces a turbulence in the band of outer flow. The sulfur particles, which are in the form of either a mist or fine crystals, make contact with the steam jacket which is a 121° C. The sulfur particles then coalesce and melt to liquid sulfur by agglomeration and grid retention, because 121° C. is the melting point of monoclinic sulfur crystals.

The liquid sulfur falls by gravity to the bottom of the separation chamber 16 and is drawn out through outlet conduit 9 and through product outlet tube 11, which is regulated by valve 10, and passes into storage. The liquid sulfur is a commercial product which is handled and stored by the well-known Frasch process. The mixed gasses pass upwardly through the involuted spiral baffle 5 and exit precipitator A through the gas outlet tube 1. From there, the gases are either emitted into the environment or are passed through precipitator B for elimination of nitric oxides.

FIGS. 1 and 2 also show precipitator B. Precipitator B's structure is substantially the same as that of precipitator A. The steam jacket 2 of precipitator B is also maintained at 121° C. The treated gas stream from precipitator A, including the nitric oxide contained in the furnace or smelter emissions, pass through emission inlet tube 29. The gaseous pollutant nitric oxide is produced in the furnace of power plants, where the high heat gives a fixation of nitrogen and oxygen to form nitric oxide:

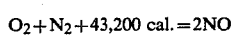
$$O_2 + N_2 + 43,200 \text{ cal.} = 2NO$$

In precipitator B, compressed air is injected by an induction draft fan 36 into the reaction chamber 15 through the reactant inlet tube 31. The amount of air injected is controlled by a computer metering program. The reactant inlet tube 31 is regulated by constant pressure inlet valve 8 to inject the precise amount of air. The air supplies oxygen for the oxidation of the nitric oxide to nitrogen dioxide, according to the following reaction:

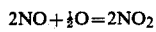
$$2NO + \tfrac{1}{2}O = 2NO_2$$

A water spray is injected into precipitator B's reaction chamber 15 through the water inlet tube 34 which is regulated by a computer-controlled valve 4. This water spray supplies water molecules to react with the nitrogen dioxide to produce nitric acid according to the following reaction:

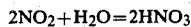
$$2NO_2 + H_2O = 2HNO_3$$

This reaction is reversible above 20° C., and at 620° C. the reaction would be completely reversed. Since precipitator B is at 121° C., completely all of the nitrogen oxide will not be removed from the furnace emissions, but the cost of cooling and reheating the emissions to remove 100% of the nitrogen oxide is not justified.

The liquid nitric acid falls by gravity to the bottom of the reaction chamber 15. It passes through duct 13 into the bottom of precipitator B's separation chamber 16. An air lift pump 19 in precipitator B pumps the nitric acid up the hollow cylindrical alignment tube 14, sealed at its base, which is located in the middle of precipitator B's separation chamber 16. The nitric acid flows over the top of the alignment tube 14 and descends by gravity through precipitator B's separation chamber 16. The acid hits the baffle 5 and descends the outer edge of the separation chamber 16, near the steam jacket 2. It is concentrated to commercial nitric acid as it descends. This concentration of the acid occurs because nitric acid is an azeotropic mixture. That is, when nitric acid is heated to 121° C., it loses whichever component is in excess, either the acid or water. Pure hydrogen nitrate (HNO3) has a boiling point of 86° C. at standard pressure.

The concentrated commercial nitric acid falls to the bottom of precipitator B's separation chamber 16 and is drawn out through outlet conduit 9 and through product outlet tube 11, which is regulated by valve 10, and passed into storage. The treated gas stream passes upwardly through precipitator B's separation chamber and is vented through precipitator B's gas outlet tube 1.

Figure 3:
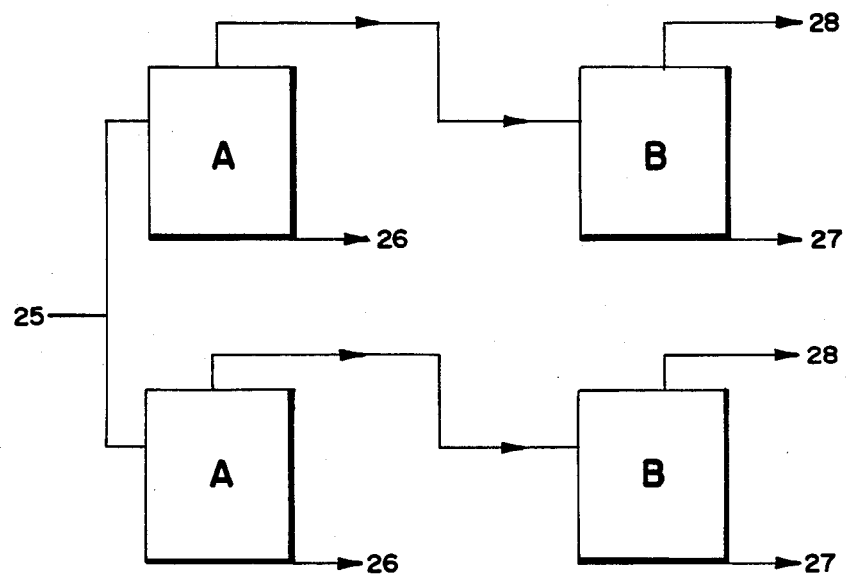
FIG. 3 is a flow chart depicting precipitators A and B in parallel operation.

FIG. 3 is a flow chart showing a pair of precipitators A and B, running in parallel. The number of precipitators running in parallel depends upon the volume of emissions from the furnace or smelter. The maximum efficiency is not reached by simply increasing the size of a single precipitator A and a single precipitator B. Each precipitator A has an outlet for liquid sulfur 26. Each precipitator B has both an outlet 27 for nitric acid and an outlet 28 for the treated gas stream. The gas stream exits 28 can also be combined in order to have only one emission stack for a power plant or smelter.

It should be noted that the furnace emissions contain some selenium dioxide which is reduced by the methane to free selenium in precipitator A. It is therefore necessary to clean the bottom of precipitator A of any accumulation of selenium periodically or at shutdown. This cleaning can be accomplished by increasing the temperature of the steam jacket to 220° C., which is the melting point of gray selenium particles. The melted selenium is twice as dense as melted sulfur, so that these two substances will separate. The selenium is withdrawn through outlet tubes 11 and 33 and valves 10 and 17 respectively of precipitator A. Selenium is slightly soluble in water, and it is toxic and dangerous. Therefore it must be properly disposed of or sold to the chemical industry.

There are several alternatives to the preferred process described above. It is optional to use a gas producer in the plant line for the destructive distillation of coal. This distillation process would furnish stoichiometrical amounts of $H_2S$, CO and $CH_4$ to react with the sulfur dioxide and to produce elemental sulfur. Another option is to use natural sour gas (containing $H_2S$) for the reduction of sulfur dioxide to sulfur. An alternative to the use of steam would be to use either hot gas or electrical heat.

While the foregoing has illustrated and described what is now contemplated to be the best mode of carrying out the invention, the description is, of course, subject to modifications without departing from the spirit and scope of the invention. Therefore, it is not desired to restrict the invention to the particular constructions illustrated and described, but to cover all modifications that may fall within the scope of the appended claims.

We claim:

1. A precipitator for the elimination of sulfur dioxide from furnace or smelter emissions and for the production of sulfur, comprising:
   (a) a cylindrical shell;
   (b) an annular steam jacket positioned within said cylindrical shell to define an annular reaction chamber between said shell and said steam jacket, and to define a cylindrical separation chamber within said steam jacket;
   (c) an emission inlet tube positioned and arranged so as to deliver the emissions to said reaction chamber, wherein said emission inlet tube has a flared end that is turned downward within said reaction chamber;
   (d) a reactant inlet tube positioned and arranged so as to deliver producer or natural gas to said reaction chamber, wherein said reactant inlet tube has an end which is positioned in said flared end of said emission inlet tube so as to provide counter current mixing of the producer or natural gas and the emissions to produce sulfur particles;
   (e) a tangential duct extending through said steam jacket so as to pass the emissions therethrough from said reaction chamber to said separation chamber;
   (f) a spiral involuted baffle positioned and arranged within said separation chamber so as to centrifugally pass the emissions through said separation chamber;
   (g) an annular grid positioned between said steam jacket and an outer edge of said baffle whereby the sulfur particles melt and coalesce so that liquid sulfur can be withdrawn from said precipitator;
   (h) an outlet conduit which is positioned in said separation chamber for the withdrawal of the liquid sulfur; and
   (i) a gas outlet tube positioned in said separation chamber to vent the emissions after treatment in said precipitator.

2. A precipitator for the elimination of nitric oxide from furnace or smelter emissions and for the production of nitric acid, comprising:
   (a) a cylindrical shell;
   (b) an annular steam jacket positioned within said cylindrical shell to define an annular reaction chamber between said shell and said steam jacket, and to define a cylindrical separation chamber within said steam jacket;
   (c) an emission inlet tube positioned and arranged so as to deliver the emissions to said reaction chanmber, wherein said emission inlet tube has a flared end that is turned downward within said reaction chamber;
   (d) a reactant inlet tube positioned and arranged so as to deliver compressed air to said reaction chamber, wherein said reactant inlet tube has an end which is positioned in said flared end of said emission inlet tube so as to provide counter current mixing of the compressed air and the emissions to produce nitrogen dioxide;
   (e) a water inlet tube positioned and arranged so as to deliver water to said reaction chamber to produce nitric acid from said nitrogen dioxide;
   (f) a tangential duct extending through said steam jacket so as to pass the emissions therethrough from said reaction chamber to said separation chamber;
   (g) an annular hollow alignment tube positioned within said separation chamber;
   (h) a spiral involuted baffle positioned and arranged around said alignment tube so as to receive nitric acid from said tube;
   (i) an air lift pump in fluid communication with said tube for pumping the nitric acid through said alignment tube to said baffle and said steam jacket in said separation chamber to become concentrated and withdrawn from said precipitator;
   (j) an outlet conduit which is positioned in said separation chamber for the withdrawal of the nitric acid; and
   (k) a gas outlet tube positioned in said separation chamber to vent the emissions after treatment in said precipitator.

* * * * *

UNITED STATES PATENT AND TRADEMARK OFFICE
CERTIFICATE OF CORRECTION

PATENT NO. : 4,702,893

DATED : October 27, 1987

INVENTOR(S) : Kirk et al.

It is certified that error appears in the above-identified patent and that said Letters Patent is hereby corrected as shown below:

In the Abstract, line 13, please delete "praticles" and substitute --particles--.

In Column 1, line 32, please delete "be" and substitute --been--.

In Column 1, line 43, please delete "environment" and substitute --environmental--.

In Column 3, line 56, please delete "a 121 " and substitute --at 121 --.

In Column 4, Line 26, please delete the equation "$2NO + 1/2\ O = 2NO_2$" and substitute --$2NO + O_2 = 2NO_2$--.

In Column 6, line 32, please delete "chanmber" and substitute --chamber--.

Signed and Sealed this

Third Day of May, 1988

Attest:

DONALD J. QUIGG

Attesting Officer

Commissioner of Patents and Trademarks